United States Patent [19]

Okada

[11] 4,420,764

[45] Dec. 13, 1983

[54] INK JET PRINTER HEAD

[75] Inventor: Junichi Okada, Shiojiri, Japan

[73] Assignees: Epson Corporation; Kabushiki Kaisha Suwa Seikosha, both of Tokyo, Japan

[21] Appl. No.: 299,470

[22] Filed: Sep. 4, 1981

[30] Foreign Application Priority Data

| | | | |
|---|---|---|---|
| Sep. 8, 1980 | [JP] | Japan | 55-124259 |
| Sep. 8, 1980 | [JP] | Japan | 55-124260 |
| Sep. 8, 1980 | [JP] | Japan | 55-124261 |
| Sep. 8, 1980 | [JP] | Japan | 55-124262 |
| Sep. 8, 1980 | [JP] | Japan | 55-124263 |

[51] Int. Cl.[3] .......... G01D 15/18

[52] U.S. Cl. .......... 346/140 R

[58] Field of Search .......... 346/140

[56] References Cited

U.S. PATENT DOCUMENTS

| | | | |
|---|---|---|---|
| 3,466,659 | 9/1969 | Ascoli | 346/140 |
| 3,662,399 | 5/1972 | Yanou | 346/140 |
| 3,708,798 | 1/1973 | Hildenbrand | 346/140 |
| 3,747,120 | 7/1973 | Stemme | 346/75 |
| 3,946,398 | 3/1976 | Kyser | 346/140 X |
| 4,034,380 | 7/1977 | Isayama | 346/140 |
| 4,189,734 | 2/1980 | Kyser | 346/140 X |
| 4,201,995 | 5/1980 | Fischbeck | 346/140 |
| 4,216,477 | 8/1980 | Matsuda | 346/140 |
| 4,251,824 | 2/1981 | Hara | 346/140 |

*Primary Examiner*—Joseph W. Hartary
*Attorney, Agent, or Firm*—Blum, Kaplan, Friedman, Silberman & Beran

[57] ABSTRACT

An ink jet printer head for printing dots on demand on a recording medium has ink flow paths formed in a substrate. The ink paths include a pressure chamber, supply path and nozzle for discharging ink droplets, the nozzle terminating in an external front face of the printer head. A piezoelectric element acting on the pressure chamber to reduce chamber volume, causes an ink droplet to be ejected. Ink flow in the paths is perpendicular to the displacement of the piezoelectric element. The front face of the printer head is adapted to contour the ink layer which forms on the front face at rapid printing rates to assure that the droplets are ejected along a line which is a linear, parallel extension of the longitudinal nozzle axis. The design principles are applicable to printer heads having single or double rows of nozzles.

9 Claims, 17 Drawing Figures

FIG. 1
PRIOR ART
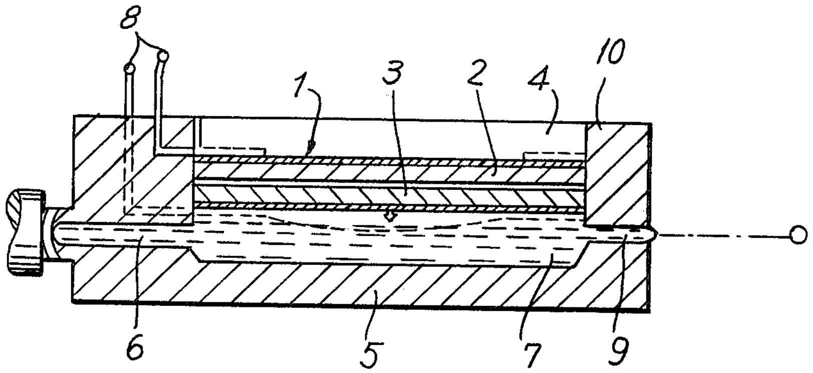
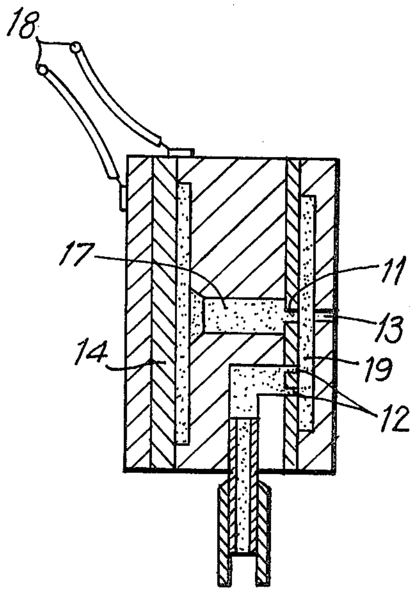
FIG. 2
PRIOR ART

FIG. 3
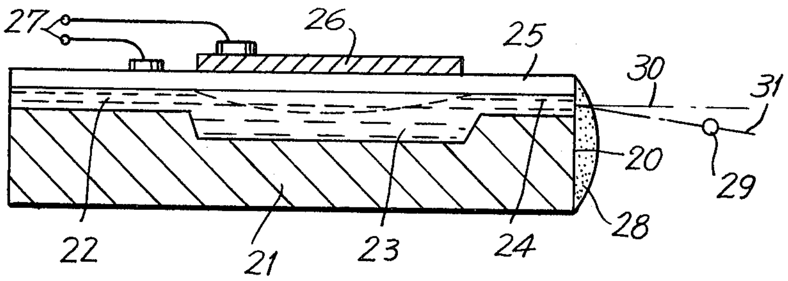
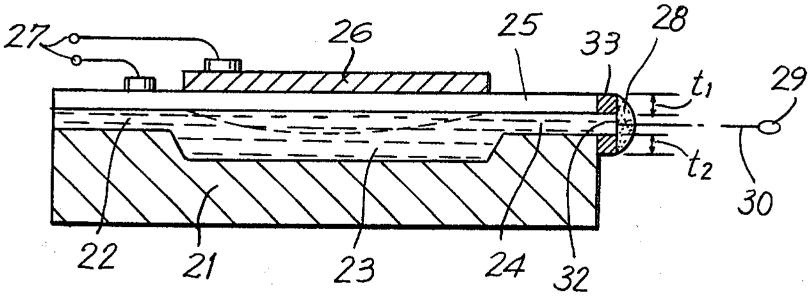
FIG. 4

FIG. 5
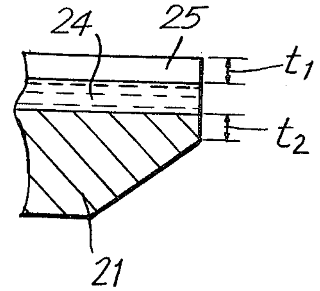
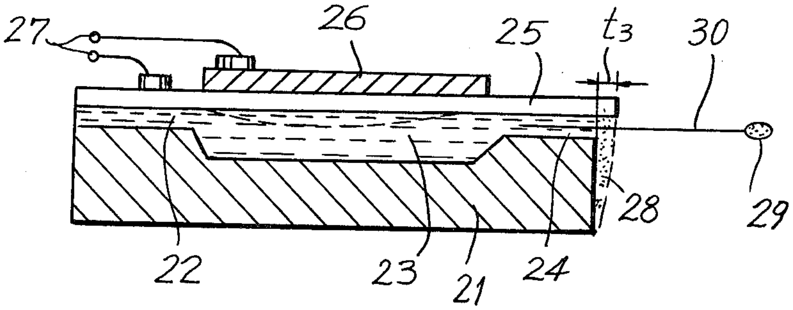
FIG. 6

FIG. 7
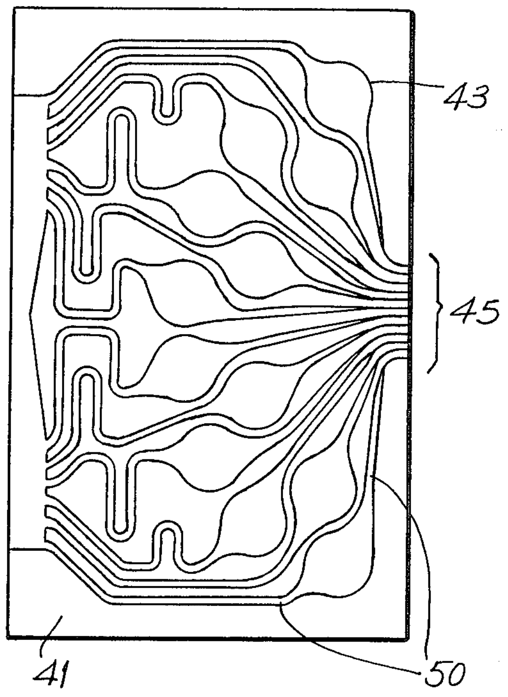
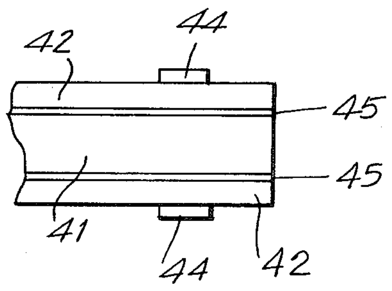
FIG. 8

FIG. 10
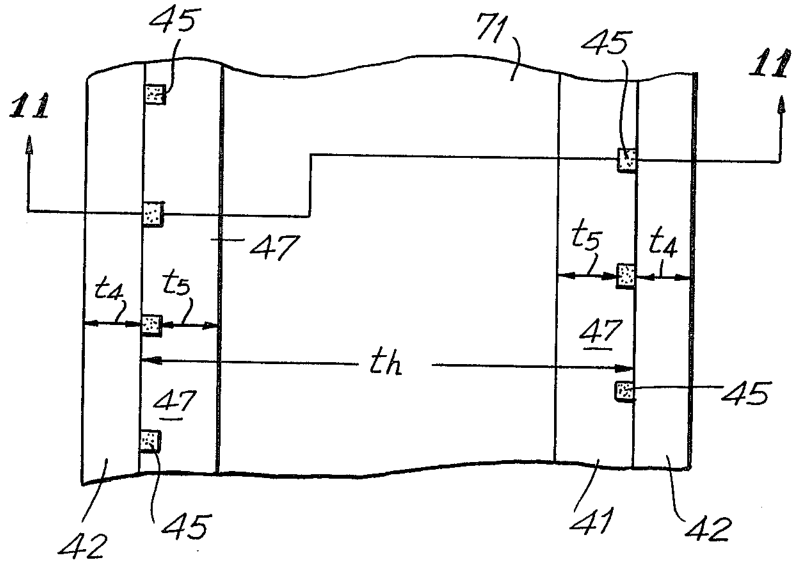
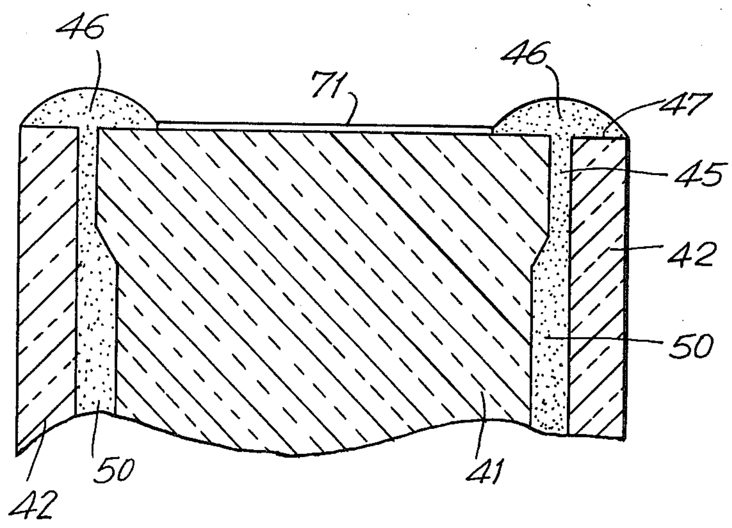
FIG. 11

FIG. 14
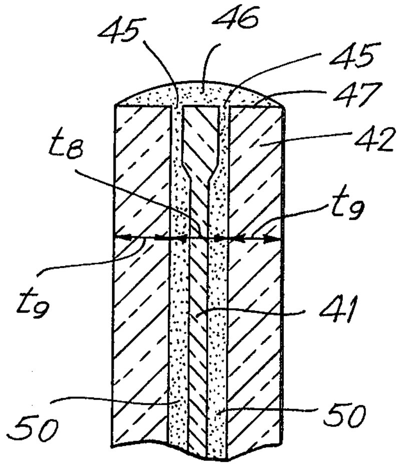
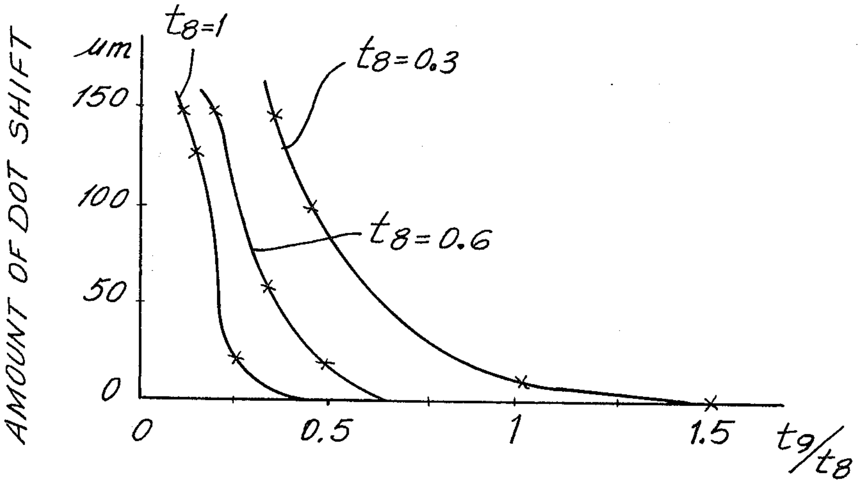
FIG. 15

INK JET PRINTER HEAD

BACKGROUND OF THE INVENTION

This invention relates generally to an ink-on-demand type ink jet printer head in which ink droplets are jetted through a nozzle for printing. A variety of ink-on-demand type ink jet printer heads have been proposed in the prior art. Typical examples of such ink jet printer heads are the Kyser apparatus, described in U.S. Pat. No. 3,946,398, and the Stemme apparatus, described in U.S. Pat. No. 3,747,120.

The Kyser system is briefly described with reference to FIG. 1 wherein the apparatus includes an electromechanical transducer 1 having piezoelectric elements 2,3. The transducer 1 is disposed in a recess 4 formed in a substrate 10 thus forming one side wall of a pressure chamber 7 for holding ink. A substrate 5 includes an ink supply path 6, the pressure chamber 7 and a nozzle 9. In combination, the substrates 5,10 form a ink jet printer head. When an input signal is applied to the input terminals 8, the transducer 1 is displaced inwardly as indicated by the broken line and the arrow to decrease the internal volume of the pressure chamber 7, thereby causing an ink droplet to be ejected from the nozzle 9. These are the fundamental design and operating principles of an ink-on-demand type ink jet printer head.

The Stemme apparatus is discussed briefly with reference to FIG. 2, wherein the ink jet printer head includes a piezoelectric element 14, a first pressure chamber 17 which is connected through a path 11 to a second pressure chamber 19 and to a nozzle 13, and an ink supply path 12 for feeding ink from an ink tank (not shown) to the second pressure chamber 19. When an input signal is applied to the input terminals 18, the piezoelectric element 14 is driven so as to decrease the volume of the first pressure chamber 17 causing ink in the chamber 17 to pass through the opening 11 and the second chamber 19, and then to be jetted in the form of droplets from the nozzle 13. This is the fundamental design and operating principles of the so-called double cavity system.

Ink droplets can be ejected at a high frequency and a plurality of chambers, nozzles, and driving transducers can be arranged in a single compound head to provide a row or several rows of closely spaced dots in the known manner. However, at high printing rates, for example, in excess of 500 Hz, an ink layer forms on the front face of the ink jet printer head in the vicinity of the nozzle openings. The droplets ejected from the nozzles pass through the surface ink layer and are deflected in their path. For this reason these ink jet printer heads suffer a disadvantage in that print quality is degraded. That is, the printing intervals are not regular because the ink droplets are ejected along a slanted or deviant axis from the axis of the nozzle. Furthermore, this makes it necessary that the ink jet printer head, and more particularly, the nozzles, to be set as close to the printing sheet or other recording medium as possible so as to minimize the dot shift due to the slanted trajectory of the droplets.

What is needed is an ink jet printer head which ejects ink droplets at a high frequency without dot shifting so that print quality is high and the nozzle openings need not be very close to the medium being printed upon.

SUMMARY OF THE INVENTION

Generally speaking, in accordance with the invention, an ink jet printer head especially suitable for high speed on-demand printing is provided. The ink jet printer head for printing dots on demand on a recording medium has ink flow paths formed in a substrate. The ink flow paths include a pressure chamber, an ink supply path and a nozzle for discharging ink droplets, the nozzle terminating in an external front face of the printer head. A piezoelectric element acting on the pressure chamber to reduce chamber volume, causes an ink droplet to be ejected. Ink flow in the paths is perpendicular to the displacement of the piezoelectric element. The front face of the printer head is adapted to contour the ink layer which forms on the front face to assure that the droplets are ejected along the line which is a linear, parallel extension of the longitudinal nozzle axis. Generally, speaking the ink droplet must pass through the ink layer perpendicular to the meniscus between the ink layer and the ambient air if a shifting in the trajectory of the ink droplet is to be prevented. This is accomplished by providing a physical symmetry around the nozzle opening. The design principles are applicable to ink jet printer heads having single or double rows of nozzles. In a multi-row nozzle arrangement, a layer which is non-affinitive, that is, non-wetting, relative to the ink, is provided between two rows of nozzles or a recess is provided between the nozzle rows so as to suitably contour the ink layer around the nozzle openings and assure a straight trajectory for the droplets.

Accordingly, it is an object of this invention to provide an improved ink jet printer head discharging ink droplets from a nozzle along a trajectory which is a linear, parallel extension of the longitudinal axis of the nozzle.

Another object of this invention is to provide an improved ink jet printer head which provides a regular printing pattern at high printing speeds by eliminating dot shift.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 1 and 2 are sectional views of ink jet printer heads in accordance with the prior art;

FIG. 3 is a sectional view of an ink jet printer head which is an improvement on the prior art of FIGS. 1 and 2;

FIG. 4 is a sectional view of an ink jet printer head in accordance with this invention;

FIG. 5 is a partial view of an alternative embodiment of an ink jet printer head in accordance with this invention;

FIG. 6 is a sectional view of another embodiment of an ink jet printer head in accordance with this invention;

FIG. 7 is a plan view of a multi-nozzle ink jet printer head with vibration plate and transducers omitted;

FIG. 8 is a partial sectional view of the ink jet printer head of FIG. 7;

FIG. 10 is a partial front view to an enlarged scale of an ink jet printer head in accordance with this invention;

FIG. 11 is a sectional view taken along the line 11—11 of FIG. 10;

FIG. 14 is another alternative embodiment of an ink jet printer head in accordance with this invention; and FIG. 15 is a graph showing the effect of particular physical parameters on dot shift in the ink jet printer head of FIG. 14.

DESCRIPTION OF THE PREFERRED EMBODIMENTS

Figure 9A:
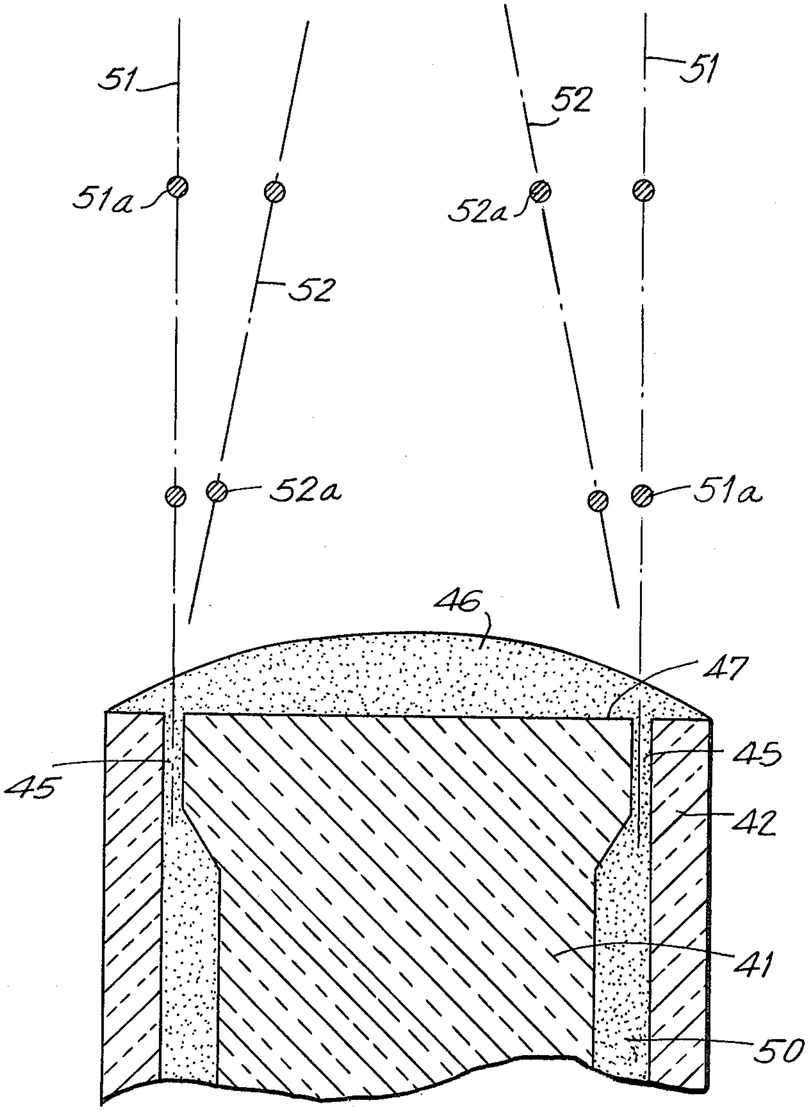
FIG. 9*a* is a portion to an enlarged scale of the ink jet printer head of FIG. 8.

The prior art ink jet printer head of FIGS. 1 and 2 demonstrate the fundamental principles of operation. In order to provide a practical apparatus, it is necessary to simplify the mechanism, to increase the effects of mass production and to thereby decrease the manufacturing cost. An ink jet printer head as shown in FIG. 3 is constructed to satisfy these requirements. In the ink jet printer head of FIG. 3, a pressure chamber 23 is formed deeper into a main substrate 21 than are an ink supplying path 22 and a nozzle 24. These elements are formed by a photo etching technique, or the like, preferably by a two-step etching technique. A flat substrate 25, that is, a vibration plate, is joined to the main substrate 21 by welding or bonding to form the ink jet printer head. A piezoelectric element 26 is attached to the flat substrate 25 in alignment with the pressure chamber 23. Input terminals 27 are provided to the electrodes on the piezoelectric element 26 in the known manner.

When an input voltage signal is applied to the piezoelectric element 26, ink droplets are jetted from the nozzle 24 to achieve printing. When the printing response frequency exceeds 500 Hz, that is, there is a capability to eject more than 500 droplets per second, an ink layer 28 forms on the front face 20 of the nozzle 24. As a result of the surface tension of the ink layer 28, an ink droplet 29 which is ejected from the nozzle 24 travels along a path 31 which is inclined downwardly (FIG. 3) from a path 30 which is a parallel linear extension to the longitudinal axis of the ink jet nozzle 24. The inclination of the line 31 from the line 30 is determined from the thickness of the ink layer 28, the velocity of the ink droplet 29 and the characteristics of the ink. Because of these factors, the ink jet printer head suffers from a problem of maintaining print quality in that the printing intervals are not regular when the ink droplets are jetted along a slanted axis. Furthermore, it is necessary with this ink jet printer head for the nozzle 24 to be set as close to the printing sheet as possible in order to minimize the dot shift resulting from the slanted paths of the droplets.

An ink-on-demand type ink jet printer head can be readily constructed in the form of a multi-nozzle type ink jet printer head. Using a simple technique such as photo-etching (FIG. 7–9), three side walls are formed for each flow path on both sides of a main substrate 41. The remaining side wall, not formed in the substrate 41 is formed by connecting a vibrating plate to both sides of the main substrate 41. Addition of the vibrating plate 42 completes a flow path including paths 50 and chamber 43 as well as the nozzle 45. A piezoelectric element 44 is bonded to the vibrating plate 42 in correspondence with each pressure chamber 43 along a flow path 50. Ink droplets are ejected through the group of nozzles 45 by applying a voltage to the selected piezoelectric elements 44 to achieve printing in the known manner.

If the printing response frequency exceeds 500 Hz, an ink layer 46 (FIG. 9*a*) forms on the front face 47 of the nozzles 45. As a result, ink droplets 52*a* are ejected along inclined paths 52 which are slanted inwardly from the jet axes 51 due to the surface tension of the ink layer 46. Ideally, droplets 51*a* travelling along the paths 51 parallel to the longitudinal axis of the nozzles 45 are desired. The angle of inclination between the desired and the actual jet path for the droplets is determined by the thickness of the ink layer 46 at the nozzle, the velocity of the ink droplets, and the characteristics of the ink.

Figure 9B:
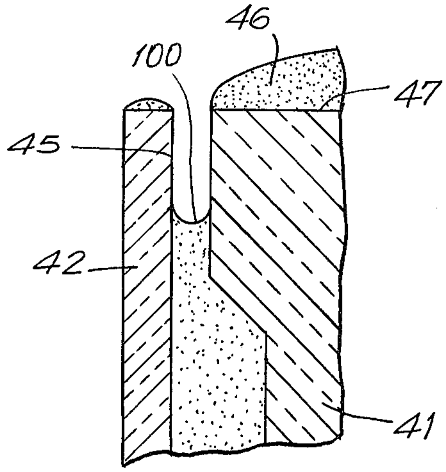
FIGS. 9*b* and 9*c* are views to a further enlarged scale of the nozzle portion of FIG. 9*a;*
Figure 9C:
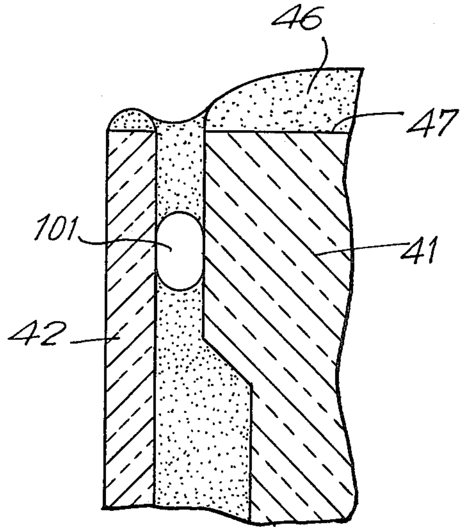

Because the ink droplets travel along the inclined paths 52 rather than the parallel path 51, a conventional multi-nozzle ink jet printer head suffers from the disadvantage that printing at regular printing intervals cannot be achieved. Morover, in this construction, as shown in FIG. 9*b,* when the volume of the pressure chamber increases after the signal is removed from the piezoelectric element, and the pressure chamber draws in ink from the ink tank (not shown) after an ink droplet has been ejected from the nozzle, the position of the meniscus 100 between the ink and the air at the top end of the nozzle moves inward of the front face 47 of the nozzle 45 and thereafter the meniscus stops in the position where the forces on the meniscus are balanced with atmospheric pressure. However, when there is a large amount of ink in the ink layer 46 the opening at the top end of the nozzle 45 is subsequently covered with the ink of the ink layer 46 and air bubble 101 is formed in the nozzle 45. When this air bubble 101 is present in the nozzle 45 and the volume of the pressure chamber is reduced at the next printing signal which drives the piezoelectric element, no ink droplet is ejected from the nozzle and some dots are missing from the printed product. As a result, proper letters cannot be formed.

An object of this invention is to provide an ink jet printer head wherein the above described problems have been resolved, that is, there is no dot shift and the distance between the nozzle and a printing sheet can be made longer.

In an ink jet printer head in accordance with this invention, an ink flow path including a supply path, a pressure chamber and a nozzle is formed between a plurality of substrates. The substrates are arranged such that the ink flow path extends substantially perpendicularly to the direction of displacement of the pressure chamber wall for the ejection of ink. The flow path is also substantially perpendicular to a front face of the ink jet printer head from which the nozzles discharge the ink droplets when the piezoelectric element is driven.

Further, in an alternative embodiment of an ink jet printer head in accordance with this invention, a plurality of nozzles and flow paths are provided and flow paths and pressure chambers and nozzles are formed on both sides of the main substrate. A front face of the ink jet printer head is substantially perpendicular to the longitudinal axes of the nozzles. The nozzles are arranged on both sides of the main substrate in such a manner that one group of nozzles is formed in a line on one side of the main substrate while another group of nozzles is formed in a second line on the other side of the main substrate. A layer is provided on the front face between the two groups of nozzles. The layer is of a substance which stays free of ink, that is, there is a non-affinity between the ink and the layer. The ink does not wet the layer surface. The width of the ink-free layer on the front face of the ink jet printer head having the nozzle discharge openings thereon, is defined such that the distance between the nozzles and one side edge of the front face substantially equals the distance between the nozzles and the closest edge of the ink free layer.

In an alternative embodiment of an ink jet printer head having two rows of ink jet nozzles, the ink free layer may be omitted and a recess formed in the front face of the ink jet printer head between the two lines of nozzles is provided. In this embodiment, the configuration of the recess is defined such that the distance between the nozzles and the closest side edge of the front face of the ink jet printer head is substantially equal to the distance between the nozzles and the closest edge of the recess.

In another embodiment of an ink jet printer head, in accordance with this invention, the distance between the closest side edge of the front face of the ink jet printer head and the nozzles is at least 0.3 mm. This may be done with auxiliary plates joined to the vibrating plates on the main substrate.

In another alternative embodiment of an ink jet printer head, in accordance with the invention, the objective to eliminate dot shift is met by setting a ratio of the distance between the nozzles and one side of the front face of the ink jet printer head to the thickness of the main substrate, at a value greater than one.

The several above-mentioned embodiments of an ink jet printer head, in accordance with this invention, are explained more fully hereinafter.

Reference is made to FIG. 4, wherein those components which have been previously described with reference to FIG. 3 and perform the same function, are identified with similar reference numerals. In the ink jet printer head of FIG. 4, an auxiliary ring 33 having a small aperture 32 therethrough is coupled to the nozzle 24. The diameter of the aperture 32 is equal to the diameter of the nozzle 24. The auxiliary ring 33 reshapes the ink layer 38 and makes it uniform around the nozzle jet axis. Accordingly, the ink droplet 29 which is ejected when the piezoelectric element 26 is driven, passes only along a path 30, which is a linear parallel extension of the longitudinal axis of the nozzle 24. As a result, there is very little dot shift.

When no auxiliary ring 33 is provided, an ink droplet having a speed of 5 meters per second, after it has moved two millimeters, would have a shift of 80 microns, whereas an ink droplet having a speed of 3 meters per second, after it has moved 2 mm, would have a shift of 400 microns. On the other hand, in an ink jet printer head, in accordance with the invention, where the auxiliary ring 33 is provided, the ink droplets have very little deflection and accordingly, there is very little dot shift which is caused. The inside and outside diameters of the ring differ by at least 0.3 mm.

It should be noted that the layer 28 does not deflect the droplet from its intended course when the droplet passes through the meniscus between the air and the layer 28 at a portion of the meniscus which is perpendicular to the longitudinal axis of the nozzle 24. The concentric positioning of the auxiliary ring 33 around the nozzle causes the liquid layer 28 to take a symmetrical shape due to surface tension concentric with the nozzle 24. In FIG. 4, $t1=t2$ and the opening 32 is concentric within the auxiliary ring 33.

In the above described embodiment (FIG. 4) the auxiliary ring 33 is employed. However, the invention is not limited to such a ring. That is, the same effect can be obtained by using auxiliary plates with thickness t1 approximately equal to t2. Furthermore, a portion of the main substrate 21 where the nozzle is formed may be cut off as shown in FIG. 5 so that the equality of t1 with t2 is maintained without the use of an auxiliary ring. All that is necessary is to modify the front face of the ink jet printer head where the nozzle discharges so as to maintain $t1 \approx t2$.

Another alternative embodiment of an ink jet printer head, in accordance with this invention, is shown in FIG. 6 wherein those components which have been described with reference to FIGS. 3 and 4 are given similar reference numerals. In the ink jet printer head of FIG. 6, the flat substrate 25, that is, the vibration plate to which the piezoelectric element 26 is attached, is extended by a distance t3 from the front face of the main substrate 21. As a result, the ink layer 28 forms with uniform thickness in the vicinity of the nozzle discharge opening. In this embodiment, the ink droplet 29 follows a trajectory 30 which is the linear parallel extension of the longitudinal axis of the nozzle 24. Very little dot shift occurs. The dimension t3, which is related to the thickness of the ink layer 28, the velocity of the ink droplet 29, the characteristics of the ink, and the structure of the head cannot be specifically defined lacking this specific data except on a case-by-case basis. However, the dimension t3 is greater than zero.

The above described embodiments of the ink jet printer head, in accordance with the invention, are readily produced by extruding plastic material although the configuration of the components around the nozzle is somewhat intricate. As is apparent from the above description, the ink jet printer head is so designed that ejected ink droplets pass along a line which is a linear parallel extension of the nozzle longitudinal axis. Thus, an ink jet printer head, in accordance with the invention, prints letters and characters with a high print quality and is free from dot shift.

An alternative embodiment of an ink jet printer head, in accordance with the invention, is shown in FIGS. 10 and 11 wherein the ink jet printer head is of the multi-nozzle type. As seen in FIG. 10, the nozzles 45 are arranged in two vertical lines and are formed into opposite sides of the main substrate 41. The fourth wall for the nozzles 45 is provided by vibration plates 42 which are attached to the sides of the main substrate 41. The nozzles connect to pressure chambers and feed paths as previously described and piezoelectric elements are mounted on the vibration plates 42 in locations corresponding to the pressure chambers formed in the main substrate 41, all as previously described.

The main substrate 41 is glass having a thickness th=1.27 mm and the flow paths 50 are formed in to both sides of the main substrate 41 to a depth of approximately 100 microns using a photo-etching technique. In each flow path, a nozzle 45 and a filter (not shown) of approximately 20 to 30 microns in depth are formed using a 2-step etching technique. The vibrating plates 42, having a thickness t4 of approximately 0.1 to 0.3 mm, are thermally fused to each side of the main substrate 41. The front face 47 is polished at the nozzles. A layer 71 which is non-affinitive to ink, that is, remains free of ink, is provided on the central portion of the front face 47 of the main substrate 41 and is substantially flush with the front face 47 as best seen in FIG. 11.

FIG. 10 is a front view of the ink jet printer head looking at the front face 47, ink repelling layer 71 and the discharge openings of the nozzles 45. The width of the non-affinitive layer 71 is established such that the distance t4 between the nozzle 45 and the outer side edges 80 of the vibrating plates 42 is substantially equal to the distance t5 between the nozzle 45 and the nearest edge of the layer 71 which is non-affinitive to ink. In other words, the nozzles 45 are centered in a region where a layer of ink forms during high frequency printing. Therefore, a plane 82 which is tangent to the interface between the ink layer 46 and the air at the intersection with the longitudinal axis of the nozzle is substantially parallel to the front face 47 as shown in FIG. 11. Accordingly, the ink droplets pass through the meniscus of the ink layer 46 in a substantially perpendicular intersection, and the ink droplet is not deflected from a path which is a linear parallel extension of the longitudinal axis of the nozzle 45. Dot shift does not occur.

As an example, if a water-based ink is used in the ink jet printer head, the layer 71 which does not have an affinity toward the ink, is readily produced by coating, spraying, or vacuum depositing a plastic, such as, Teflon. In FIG. 10, the nozzles are spaced apart laterally by an integer number of times of the spacing between dots in a horizontal row of a character printed by a combination of dots. In the vertical direction, the dots in both rows are equally spaced apart. However, the nozzles 45 are staggered such that the nozzles in one row are aligned to the half pitch distance, that is, the midpoint location of the nozzles in the other row. This staggered arrangement and lateral spacing is not unconventional in an ink jet printer head of the multi-row type.

In the embodiments described above, the vibrating plate 42 forms one sidewall of each nozzle 45. However, at least one sidewall of the nozzle may be formed with a different material. Further, in the described embodiments, the ink flow paths are formed into both sides of the main substrate 41. However, in alternative embodiments of an ink jet printer head in accordance with the invention, the ink flow paths may be formed in the vibrating plates 42 or may be formed in part in both the main substrate 41 and in the vibrating plates 42.

As previously stated, and as is clear from the above descriptions, in an ink jet printer head in accordance with the invention, a plane perpendicular to the longitudinal axis of the ink nozzle and tangent to the meniscus of the ink layer at the point of intersection of said longitudinal axis, is made substantially parallel to the front face 47 where the nozzles discharge. Accordingly, the ink droplets are not deflected from a linear parallel extension of the longitudinal axis of the nozzle. Thus, an ink jet printer head in which no dot shift is caused and in which printing is carried out with a high density and high print quality is provided.

Figure 12:
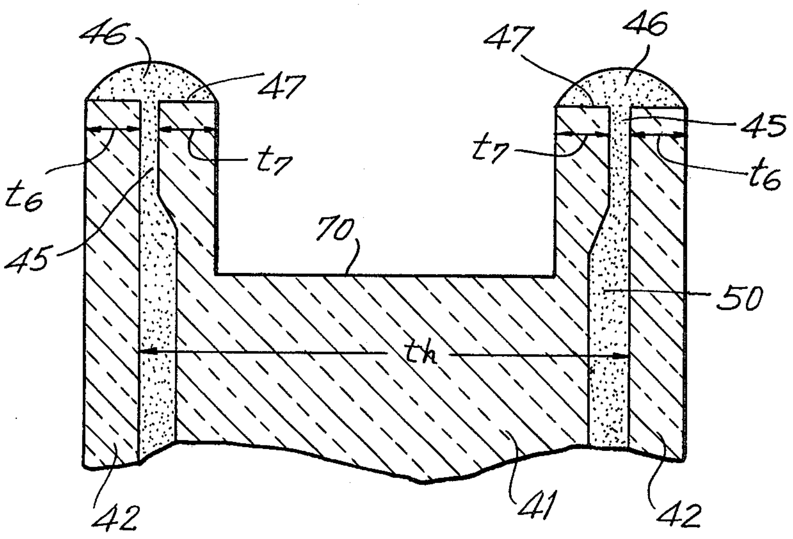
FIG. 12 is a view similar to FIG. 11 of an alternative embodiment of a multi-nozzle ink jet printer head in accordance with this invention.

An alternative embodiment of a multi-row ink jet printer head in accordance with the invention is shown in FIG. 12. In this ink jet printer head, a recess 70 is cut into the central portion of the front face 47 of the main substrate 41. The width of the recess 70 is such that the remaining thickness t7 at the nozzle 45 substantially equals the thickness t6 of the vibrating plate 42 which forms the outer wall surface of the nozzle 45. Separate ink layers 46 form at each nozzle 45 with an air/ink meniscus which is symmetrical around the discharge opening of the nozzle 45 as seen in FIG. 12.

When printing is performed and the ink layers 46 are formed, a plane tangent to the meniscus at the intersection of the linear parallel extension of the longitudinal axis of the nozzle 45 with the meniscus, is substantially parallel to the front faces 47 adjacent the nozzles. Accordingly, the surface tension of the ink layer acts uniformly on the ink droplet passing through the ink layer 46. Therefore, the ink droplets are jetted perpendicularly to the meniscus and dot shift is not caused. The depth of the recess 70 is selected such that even when the ink layers 46 flow into the recess 70 as their volumes increase, the ink layers 46 for two rows of nozzles do not connect to each other through the recess.

Figure 13:
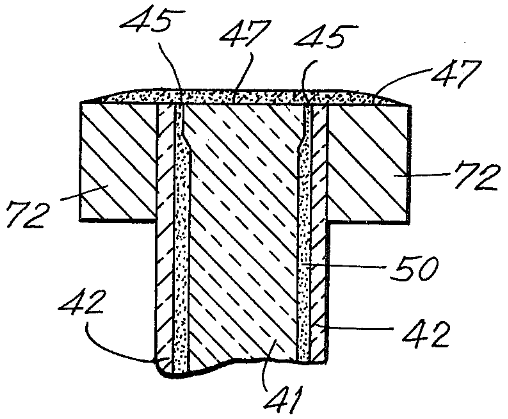
FIG. 13 is a partial sectional view of another alternative embodiment of an ink jet printer head in accordance with this invention.

In an alternative embodiment of an ink jet printer head in accordance with the invention, as shown in FIG. 13, auxiliary plates 72 are thermally fused to the vibrating plates 42 in the region of the discharge openings of the nozzles 45. The auxiliary plates 72 and the front face 47 of the main substrate 41 are polished simultaneously so that a thin ink layer 46 can spread to the outer edges of the auxiliary plates 72. The auxiliary plates 72 extend the width of the front face 47 to such a degree that the ink layer 46 is substantially of one thickness where the discharge openings of the nozzles 45 are located. Tapering in thickness of the ink layer 46 occurs near the outer edges of the auxiliary plates 72. Accordingly, the ink droplets pass in a straight line which is a linear parallel extension of the longitudinal axis of the nozzles 45 and no dot shift is caused.

In the embodiment of FIG. 13, the auxiliary plates 72 are thermally fused with the vibrating plates 42. However, the same result can be achieved by increasing the thickness of an end portion of the vibrating plate 42 which forms the nozzles 45. Then, the thickness of only a portion of the vibrating plate 42 where the piezoelectric element 44 is bonded is decreased. As the width of the nozzle front face 47 is increased, the nozzle openings can readily be made flat by polishing and the nozzles 45 can be easily covered with a lid (not shown).

Another alternative embodiment of an ink jet printer head in accordance with the invention is shown in FIG. 14. Ink flow paths 50, having a pattern similar to that shown in FIG. 1, are formed in both sides of the main substrate 41, which, for example, is glass having a thickness of 0.3 mm, by photo-etching. The flow paths 50 are etched to a depth of approximately 100 microns. In each flow path 50, a nozzle 45 and a filter (not shown) having a depth of about 20 to 30 microns are formed by a two-step etching process. A vibrating plate 42 having a thickness t9, of 0.3 to 1.0 mm is thermally fused to each side of the main substrate 41. The nozzle front face 47 is polished. A piezoelectric element (not shown) is bonded to the vibrating plates 42 in association with each pressure chamber and nozzle, and electrodes are connected to the piezoelectric element in the known manner.

An ink jet printer head was constructed with these dimensions and the thickness t8 of the main substrate 41 and the thickness t9 of the vibrating plate were varied. The ink which was used had a surface tension of 45 dyn/cm and a viscosity of 1.8 c.p. The velocity of the ejected droplets was approximately 3 to 5 meters per second. Results of the tests are indicated graphically in FIG. 15. When the ratio of the vibrating plate thickness t9 to the main substrate thickness t8 exceeds 1, there is very little dot shift as measured at a distance of 2 mm from the discharge opening of the nozzle. When the ratio exceeds 1, the interface between the ink layer 4 and the air (FIG. 14) is substantially perpendicular to the longitudinal axis of the nozzles. Therefore, surface tension in the ink acts substantially uniformly on the ink droplets in both lateral directions. As a result, the ink droplets are ejected along a straight trajectory which is an elongation of the longitudinal axis of the nozzle.

In the ink jet printer head of FIG. 14, the ink flow path have been described as being formed in the main substrate 41 by etching. However, the ink paths may be formed in the vibrating plates 42 be may be formed in both the main substrate 41 and the vibrating plates 42. The thickness of the ink jet printer head may be controlled by using a different material as the vibrating plate 42 which forms one sidewall of the nozzle 45, or one sidewall of the nozzle may be formed using a different material. Thus, an ink jet printer head in which no dot shift is caused and in which printing can be carried out with a high density and a high print quality is provided. Additionally, in an ink jet printer head in accordance with the invention, ink droplets are ejected without producing air bubbles in the nozzles.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ink jet printer head for ejecting ink droplets for printing on a recording medium, comprising;

a first substrate, said first substrate having a portion of a front face formed thereon, said front face having a planar surface;

a pair of second substrates, said second substrates being positioned on opposite sides of said first substrate, and the end of each said second substrate being another portion of said front face, thickness of said second substrates being not more than half of that of said first substrate; a plurality of nozzles, each said nozzle having a discharge opening at said planar surface, said nozzles being arranged in two linear rows, droplets being ejected selectively through said nozzle discharge openings upon actuation or said ink jet printer head, said front face being subject to the formation of an ink layer thereon around said nozzle discharge openings, an ink flow path connected to each said nozzle, said ink flow path including an ink supply portion and a pressure chamber, said ink flow path and said nozzle being formed between said first substrate and each said second substrate;

means for selectively pressurizing said ink in each said flow path, said selective pressurizing causing the ejection of a droplet from the associated nozzle; and means for controlling the trajectories of said droplets ejected from said nozzles by providing a symmetry in said ink layer around said nozzle openings, said means for controlling the trajectories of said droplets being formed in said front face surface between said linear rows of nozzles, each said controlled trajectory being a linear extension of the respective longitudinal axis of the nozzle ejecting the droplet.

2. An ink jet printer head as claimed in claim 3, wherein said means for controlling the trajectories of said droplets includes a layer provided on said front face, said layer being positioned between said linear rows and having a non-affinity to said ink, whereby said layer is free of ink.

3. An ink jet printer head as claimed in claim 2, wherein said non-affinitive layer is continuous on said front face and is positioned a distance away from first edges of said rows of nozzle discharge openings as the opposite edges of said rows of nozzle discharge openings are away from the side edges of said front face.

4. An ink jet printer head as claimed in claim 1, wherein said means for controlling the trajectories of said droplets includes a recess formed in said front face surface between said linear rows of nozzles.

5. An ink jet printer head as claimed in claim 4, wherein the distance of the edges of said recess away from first edges of said rows of nozzles is substantially equal to the distances from the opposite edges of said rows of nozzles to the side edges of said front face.

6. An ink jet printer head as claimed in claim 1, wherein said means for pressurizing said ink deforms said deformable wall in a direction of displacement substantially perpendicular to the direction of said ink flow path and said nozzle.

7. An ink jet printer head as claimed in claim 6, wherein said means for pressurizing said ink in said flow path is a piezoelectric element.

8. An ink jet printer head as claimed in claim 2 wherein said layer is formed of Teflon.

9. An ink jet printer head as claimed in claim 1, wherein said flow path is formed in said first substrate to a depth of approximately 100 microns, said first substrate is glass approximately 1.3 mm in thickness, said nozzle is formed to a depth of approximately 20 to 30 microns and said second substrates have a thickness of 0.1 to 0.3 mm.

* * * * *